United States Patent [19]

Tourville

[11] Patent Number: 4,891,998
[45] Date of Patent: Jan. 9, 1990

[54] MOTION CONVERSION APPARATUS

[75] Inventor: Thomas W. Tourville, Goleta, Calif.

[73] Assignee: Santa Barbara Research Center, Goleta, Calif.

[21] Appl. No.: 209,246

[22] Filed: Jun. 20, 1988

[51] Int. Cl.$^4$ .................. F16H 21/40; G02B 26/10
[52] U.S. Cl. .................................. 74/48; 74/25; 350/6.6
[58] Field of Search ................ 74/25, 47, 48, 70; 350/6.6

[56] References Cited

U.S. PATENT DOCUMENTS

| | | | |
|---|---|---|---|
| 2,442,586 | 6/1948 | Clark | 74/48 X |
| 2,748,611 | 6/1956 | Cusson | 74/70 |
| 4,155,620 | 5/1979 | Rawson | 350/6.6 |
| 4,747,318 | 5/1988 | Forrester | 74/25 |

FOREIGN PATENT DOCUMENTS 461167 1/1951 Italy ................................ 74/48

*Primary Examiner*—Allan D. Herrmann
*Attorney, Agent, or Firm*—W. C. Schubert; W. K. Denson-Low

[57] ABSTRACT

A motion conversion apparatus 10 for converting continuous rotary motion into oscillatory, wide angle scanning motion is disclosed herein. The motion conversion apparatus 10 of the present invention includes a link 40 disposed to pivot about a pair of pivot points 33 and 35. The link 40 induces oscillation about a first axis of a member 11 coupled thereto thereby providing output oscillatory scanning motion. The apparatus 10 of the present invention further includes flywheel means 20 and 30 adapted to rotate about a second axis for causing the link 40 to pivot about the pivot points 33 and 35. A shaft 14 operatively coupled to the flywheel means 30 supplies input rotary motion.

2 Claims, 2 Drawing Sheets

MOTION CONVERSION APPARATUS

BACKGROUND OF THE INVENTION

1. Field of the Invention:

This invention relates to motion conversion mechanisms. More specifically, this invention relates to motion conversion mechanisms driven by a rotating member.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art:

Scanning imaging systems are currently utilized in a variety of applications. For example, scanning imaging systems have been used in planetary mapping and in medical imaging. Such scanning systems typically require a scanning member to survey a field of view in a bidirectional or unidirectional manner. A mirror or imaging device attached to the scanning member may then be utilized to sequentially focus on individual regions within a scene. In this manner electromagnetic energy collected from each region within the scene is used to construct an image.

Scanning members may be driven by a number of mechanisms. For example, when a bidirectional harmonic scan is desired a spring mechanism may be employed to drive the scanning member. A harmonic scan is one in which the displacement versus time plot for the scanning member (relative to a fixed reference) assumes a sinusoidal shape. The scanning member is driven when the spring mechanism is displaced from a rest position and thereby induced to oscillate.

If nonlinearities are desired in a harmonic scan, resistive elements may be included within the spring mechanism. These resistive elements oppose oscillation of the spring mechanism in a predetermined manner and thereby enable perturbation of the harmonic scan. However, spring mechanisms are typically limited to applications requiring a scanning motion having a fundamentally harmonic (sinusoidal) component. Moreover, the maximum scan velocity afforded by harmonic scan mechanisms is inadequate for certain applications. Further, spring elements within such spring mechanisms may become fatigued and break after prolonged usage.

When a nonlinear, nonharmonic scan is desired driving mechanisms often termed "Geneva" mechanisms may be utilized. A standard Geneva mechanism includes a "driver"0 and a "follower". The driver is typically disk-shaped while the periphery of the follower generally includes a plurality of U-shaped slots. In most instances the driver is kept in uniform rotation by an external motor. A pin fastened to the driver sequentially engages the slots of the follower. For continuous rotation of the driver, the follower alternately rolls with the driver and then remains stationary. In this manner a standard Geneva mechanism generates an intermittent, unidirectional scanning motion from a continuous rotary motion.

The relative sizes of the driver and follower, and the number of slots included in the follower are the parameters typically manipulated when designing a standard Geneva mechanism for a particular application. By varying these parameters and adjusting the rotational speed of the driver, Geneva mechanisms can be designed for nonharmonic unidirectional scanning applications.

However, scanning members coupled to standard Geneva mechanisms are limited to scanning angles of 90 degrees or less. This constraint typically prevents standard Geneva mechanisms from being utilized in applications requiring a wide scan angle. Further, due to the unidirectional rotation of the driver within standard Geneva mechanisms, such mechanisms are unable to provide a bidirectional (oscillatory) scan.

Hence a need in the art exists for a scanner driving mechanism capable of converting continuous rotary motion into oscillatory, wide angle scanning motion.

SUMMARY OF THE INVENTION

The need in the art for a scanner driving mechanism for converting continuous rotary motion into oscillatory, wide angle scanning motion is addressed by the motion conversion apparatus of the present invention. The motion conversion apparatus of the present invention includes a link disposed to pivot about a pivot point. The link induces oscillation about a first axis of a member coupled thereto thereby providing output oscillatory scanning motion. The apparatus of the present invention further includes flywheel means adapted to rotate about a second axis for causing the link to pivot about the pivot point. A shaft operatively coupled to the flywheel means supplies input rotary motion.

DETAILED DESCRIPTION OF THE INVENTION

Figure 1:
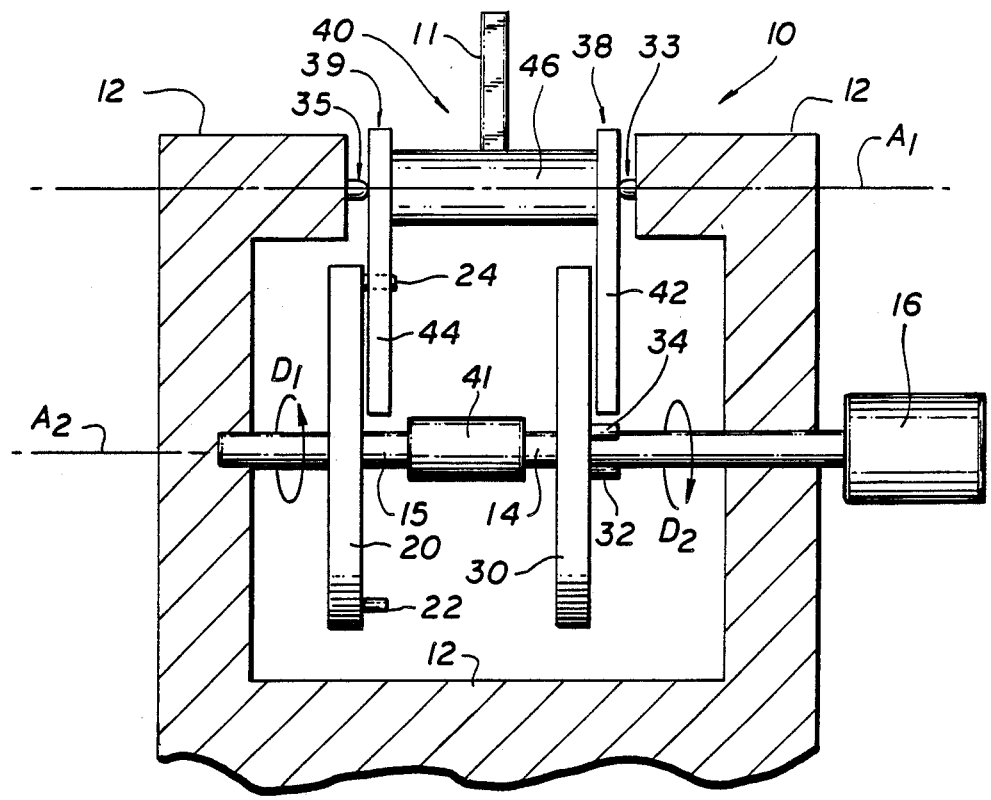
FIG. 1 is a front view of a preferred illustrative embodiment of the motion conversion apparatus 10 of the present invention.

FIG. 1 is a front view of a preferred embodiment of the motion conversion apparatus 10 of the present invention. As is discussed below, the motion conversion apparatus 10 is operative to induce oscillation of a scanning member 11 coupled thereto about a first axis $A_1$.

In the illustrative embodiment of FIG. 1, the apparatus 10 of the present invention includes a first flywheel 20 and a second flywheel 30 adapted to rotate about a second axis $A_2$. Attached to the first flywheel 20 are drive rollers 22 and 24 and attached to the second flywheel 30 are drive rollers 32 and 34. The drive rollers 22, 24, 32 and 34 are positioned to provide coupling between the flywheels 20 and 30 and a link 40. The link 40 includes a pair of rigid inverted V-shaped coupling arms 42 and 44 which are permanently attached to a second shaft 46 at the respective vertices thereof 33 and 35. Both the second shaft 46 and the arms 42 and 44 are typically metallic. As discussed in more detail below, on rotation of the flywheels 20 and 30 the coupling arms 42 and 44 are engaged by the drive rollers 22, 24, 32 and 34. The apparatus 10 is held by a frame 12 and coupled to an input shaft 14. The shaft 14 is driven by a motor 16. The shafts 14 and 15 are operatively coupled by a gear set arrangement 41. As is known to those skilled in the art; the gear set arrangement 41 may be realized by a conventional spur or differential gear set. The gear set arrangement 41 constrains the shafts 14 and 15, and thus the flywheels 20 and 30, to rotate in opposite directions at substantially identical angular speeds. Specifically, the first flywheel 20 and the shaft 15 rotate in a first direction $D_1$ about the axis $A_2$. Similarly, the second flywheel 30 and the input shaft 14 rotate in a second direction $D_2$ about the axis $A_2$. The shafts 14 and 15 are attached to the flywheels 20 and 30 by conventional means. In the preferred embodiment, this gear set arrangement is chosen to yield a 1:1 counter-rotating gear ratio between the flywheels 20 and 30. In this manner the flywheels 20 and 30 are constrained to rotate at approximately the same angular rate in opposite directions about the axis $A_2$. The gear set arrangement 41 allows the motor 16 to be coupled to both of the shafts 14 and 15 and thereby drive both of the flywheels 20 and 30.

The flywheels 20 and 30, and drive rollers 22, 24, 32 and 34 are typically fabricated from a metallic material. In the embodiment of FIG. 1, the drive rollers 22, 24, 32 and 34 are small ball bearings fastened to the flywheels 20 and 30 with conventional shoulder screws.

The moments of inertia of the flywheels 20 and 30 with respect to the axis $A_2$ are typically chosen to be large relative to the moment of inertia of the link 40 with respect to the axis $A_1$. In the embodiment of FIG. 1 the flywheels 20 and 30 have substantially identical moments of inertia. Although the flywheels 20 and 30 are of substantially identical size and weight in the preferred embodiment, it is understood that the flywheels 20 and 30 may be designed, constructed and weighted to suit the intended application.

As will be described more fully below, rotation of the first and second flywheels 20 and 30 in opposite directions about the axis $A_2$ causes the link 40 to pivot about the axis $A_1$ at pivot points 33 and 35. In particular, the second shaft 46 pivots about the axis $A_1$ in response to alternate engagement of the coupling arms 42 and 44 by the drive rollers 22, 24, 32 and 34. In this manner rotary motion of the flywheels 20 and 30 is converted to oscillatory motion of the scanning member 11 about the axis $A_1$.

Figure 2:
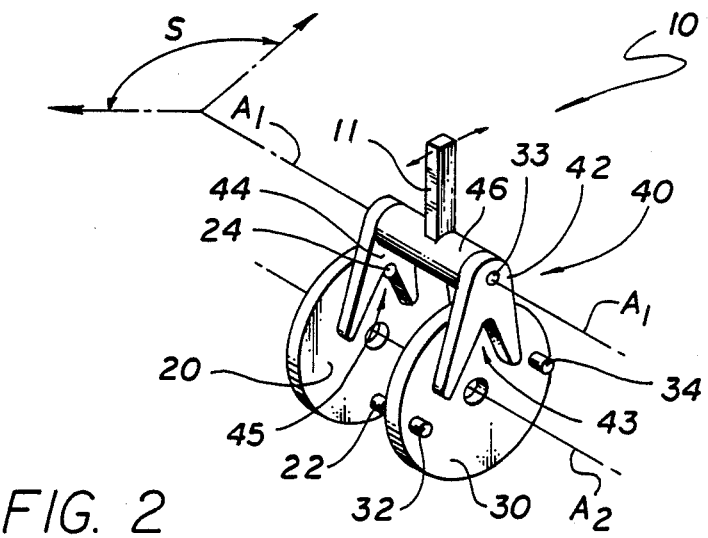
FIG. 2 is a partially disassembled simplified perspective view of a preferred embodiment of the motion conversion apparatus 10 of the present invention.

FIG. 2 shows a partially disassembled simplified perspective view of the apparatus 10 of the present invention. The embodiment of the apparatus 10 shown in FIG. 2 includes the first and second flywheels 20 and 30, the link 40 and the scanning member 11. The scanning member 11 describes an angle S about the axis $A_1$ in response to pivoting of the link 40. The link 40 includes the second shaft 46 with inverted V-shaped coupling arms 42 and 44 fastened thereto. At the elbows of the coupling arms 42 and 44 are coupling slots 43 and 45 which are engaged by the drive rollers 22, 24, 32 and 34 upon rotation of the flywheels 20 and 30. For clarity the frame 12, shafts 14 and 15, gear set arrangement 41 and motor 16 have been omitted from the perspective view of FIG. 2. The slots 43 and 45 may be realized by appropriate machining of metallic slabs from which the arms 42 and 44 are fabricated.

As mentioned above, standard Geneva mechanisms are typically equipped with follower members having only U-shaped slots. As a result such mechanisms are limited to providing scanning angles of 90 degrees or less. In contrast, in the embodiment of FIG. 2 the shape of the slots 43 and 45 in the coupling arms 42 and 44 allows the angle S described by the scanning member 11 to be larger than 90 degrees. Further, irregularities may be introduced in the contours of the slots 43 and 45 to introduce nonlinearities in the oscillatory motion of the scanning member 11. Similarly, the angle S (FIG. 2) described by the oscillating scanning member 11 may be varied by adding additional drive rollers to the flywheels 20 and 30 and by making corresponding adjustments to the width of the slots 43 and 45. For example, the illustrative embodiment of the apparatus 10 shown in FIG. 2 may be modified by adding a third drive roller to each of the flywheels 20 and 30. The slots 43 and 45 would then be narrowed such that the link 40 would be alternately engaged by the flywheels 20 and 30. In this manner the scanning member 11 would oscillate in a continuous, bidirectional mode through an angle narrower than the angle S shown in FIG. 2.

The scanning member 11 and second shaft 46 may be shaped from a monolithic metal section or may be constructed from two separate metallic pieces fastened together. Again, in alternative embodiments the scanning member 11 and second shaft 46 may be fabricated from a composite material other than metal. In the embodiment of FIG. 2 the scanning member 11 is typically directly coupled to a scanning element of an optical instrument. This optical scanning element may be a mirror, a telescope, or detector which surveys a field of view as the scanning member 11 oscillates about the axis $A_1$.

Figure 3A:
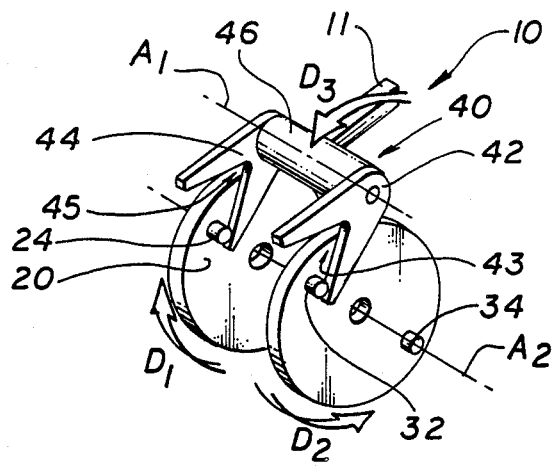
FIGS. 3a, 3b and 3c sequentially illustrate the operation of the motion conversion apparatus 10 of the present invention.
Figure 3B:
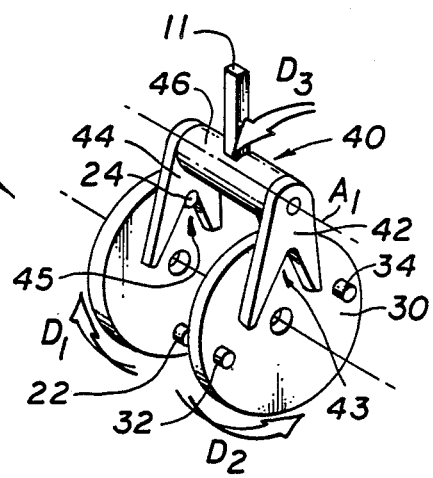
Figure 3C:
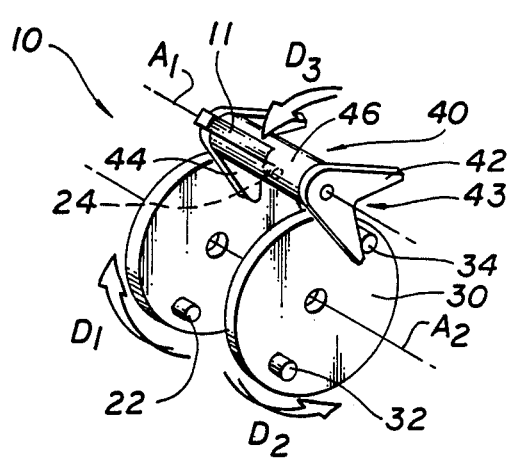

FIGS. 3a, 3b and 3c illustrate the operation of the apparatus 10 of the present invention. The scanning member 11 has been omitted from the illustrations of FIG. 3 for clarity. As shown in FIG. 3 the first and second flywheels 20 and 30 rotate in directions $D_1$ and $D_2$, respectively, about the axis $A_2$. In progressing through the sequence of FIGS. 3a, 3b, and 3c the link 40 pivots about the axis $A_1$ in a direction $D_3$. Also, in FIGS. 3a and 3c the link 40 is shown fully displaced from the centered position shown in FIG. 3b.

In the illustration of FIG. 3a the drive roller 24 attached to the first flywheel 20 is shown in engagement with the slot 45 of the coupling arm 44. Similarly, the drive roller 32 of the second flywheel 30 is nearly ready to disengage the coupling arm 42. In moving from FIG. 3a to FIG. 3b the coupling arm 42 has now been completely disengaged by the drive roller 32 and the drive roller 24 has moved well within the slot 45. In this way the link 40 is alternately engaged by the first and second flywheels 20 and 30.

As shown in FIG. 3c the drive roller 24 is positioned to disengage the coupling arm 44 as a result of motion of the first flywheel 20 in the direction $D_1$. In a parallel manner rotation of the second flywheel 30 in the direction $D_2$ has sufficiently advanced the drive roller 34 to engage the coupling arm 42. Upon engagement of the coupling arm 42 by the drive roller 34 the link 40 will begin to rotate about the axis $A_1$ in the direction opposite to the direction $D_3$. That is, both FIGS. 3a and 3c illustrate points in time in which the link 40 is changing direction.

As is evident upon inspection of FIG. 3, the coupling arm 44 is engaged by the drive roller 24 for approximately 90 degrees of rotation of the first flywheel 20. For the remaining 270 degrees of rotation of the first flywheel 20, the drive roller 24 is disengaged from the arm 44. In a similar manner the drive rollers 22, 32 and 34 each engage the link 40 for 90 degrees of rotation of the flywheels 20 and 30. This allows the link 40 to be engaged by one of the drive rollers 22, 24, 32 and 34 at all times during operation of the apparatus 10. In this manner the scanning member 11 (FIG. 2) oscillates in a continuous, bidirectional fashion about the axis $A_1$.

In contrast, however, the scanning member 11 may be made to oscillate intermittently by removing either the drive roller 22 or 24 from the first flywheel 20 and either the drive roller 32 or 34 from the second flywheel 30. For example, if in the embodiment of FIGS. 3a–3c drive rollers 22 and 32 were removed the link 40 would initially be engaged by the drive roller 24 for 90 degrees of rotation of the flywheel 20. During this interval the link 40 would pivot about the axis $A_1$ in the direction $D_3$. Next, the link 40 would be engaged by the drive roller 34 for 90 degrees of rotation of the flywheel 30 and would pivot in the direction opposite that of $D_3$. The link would then remain stationary for 180 degrees rotation of the flywheel 20 whereupon the above cycle would be repeated. In this manner the scanning member 11 would intermittently oscillate about the axis $A_1$.

As is shown in FIG. 3, the drive rollers 22, 24, 32 and 34 remain in contact with the surfaces of the slots 43 and 45 due to the acceleration and deceleration of the link 40. In certain instances, however, it may be required to insure that the drive rollers 22, 24, 32 and 34 remain in full contact with the surfaces of the slots 43 and 45 when engaged by the link 40. This requirement may be satisfied in an alternative embodiment by coupling the flywheels 20 and 30 to the link 40 with preloading springs. In which case, the springs would be connected to the flywheels 20 and 30 along the axis $A_2$ and to the link 40 at points 38 and 39. For example the spring may be connected to a housing enclosing the shaft 14 and to the point 38. In this way the link 40 and flywheels 20 and 30 are more securely coupled.

Thus the present invention has been described with reference to a preferred embodiment in connection with an illustrative application. Those having ordinary skill in the art and access to the teachings of the present invention will recognize additional modifications, embodiments and applications within the scope thereof. For example, as mentioned above, shapes and orientations of the coupling arms and the shapes and positions of the slots may be changed to effect changes in the motion of the scanning member without departing from the scope of the present invention. The invention is similarly not limited to the particular shape or placement of the drive rollers relative to the flywheels. Further, the number of drive rollers and flywheels used in alternative embodiments of the present invention may vary from those disclosed herein. Additionally, the scanning member may be induced to oscillate by the link in a manner different from that illustrated herein without departing from the scope of the present invention.

It is therefore contemplated by the appended claims to cover any and all such modifications.

Accordingly, what is claimed is:

1. A motion conversion apparatus for converting input rotational motion into output oscillatory motion comprising:
   link means disposed to pivot about a pivot point and coupled to a first member for inducing oscillation of said first member about a first axis thereby providing said output oscillatory motion, said link means including first and second slotted coupling arms attached to opposite ends of a first shaft;
   flywheel means adapted to rotate about a second axis for causing said link means to pivot about said pivot point said flywheel means including:
   first and second flywheels rotating in opposite directions about said second axis;
   drive roller means mounted on said first and second flywheels for engaging said link means;
   means for coupling said first and second flywheels; and
   shaft means adapted to rotate about said second axis and operatively coupled to said flywheel means for providing said input rotational motion.

2. In an infrared scanner driver apparatus having an optical scanning element coupled thereto, a motion conversion apparatus comprising:
   first and second disk-shaped flywheels rotating in opposite directions about a first axis;
   a first pair of drive rollers fastened symmetrically with respect to said first axis to said first flywheel;
   a second pair of drive rollers fastened symmetrically with respect to said first axis to said second flywheel;
   a shaft attached to said scanning element having first and second ends and having a longitudinal axis substantially parallel to a second axis;
   a first coupling arm having a first coupling slot, said first arm being secured to said first end of said shaft and positioned such that said first pair of rollers engage said first slot upon rotation of said first flywheel; and
   a second coupling arm having a second coupling slot, said second arm secured to said second end of said shaft and positioned such that said second pair of rollers engage said second slot upon rotation of said second flywheel.

* * * * *